(12) United States Patent
Zhou et al.

(10) Patent No.: US 10,880,493 B2
(45) Date of Patent: *Dec. 29, 2020

(54) IMAGING DEVICE, METHOD AND SYSTEM OF PROVIDING FILL LIGHT, AND MOVABLE OBJECT

(71) Applicant: SZ DJI TECHNOLOGY CO., LTD., Shenzhen (CN)

(72) Inventors: You Zhou, Shenzhen (CN); Cong Zhao, Shenzhen (CN); Jiaqi Yan, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/678,075

(22) Filed: Nov. 8, 2019

(65) Prior Publication Data

US 2020/0077004 A1 Mar. 5, 2020

Related U.S. Application Data

(63) Continuation of application No. 16/216,018, filed on Dec. 11, 2018, now Pat. No. 10,477,116, which is a continuation of application No. 15/722,473, filed on Oct. 2, 2017, now Pat. No. 10,171,749, which is a continuation of application No. PCT/CN2015/075595, filed on Mar. 31, 2015.

(51) Int. Cl.
*H04N 5/238* (2006.01)
*G03B 7/16* (2014.01)
(Continued)

(52) U.S. Cl.
CPC ............. *H04N 5/238* (2013.01); *G03B 7/16* (2013.01); *G03B 15/05* (2013.01); *H04N 5/2351* (2013.01);
(Continued)

(58) Field of Classification Search
None
See application file for complete search history.

(56) References Cited

U.S. PATENT DOCUMENTS 4,812,872 A 3/1989 Desormeaux
5,384,616 A 1/1995 Wilson et al.
(Continued)

FOREIGN PATENT DOCUMENTS

CN 1418017 A 5/2003
CN 101000445 A 7/2007
(Continued)

OTHER PUBLICATIONS

The World Intellectual Property Organization (WIPO) International Search Report and Written Opinion for PCT/CN2015/075595 dated Jan. 11, 2016 9 pages.

*Primary Examiner* — William B Perkey
(74) *Attorney, Agent, or Firm* — Anova Law Group, PLLC

(57) ABSTRACT

A system includes an image sensor configured to obtain consecutive image frames, an exposure parameter acquisition unit configured to obtain a current automatic exposure parameter of a current image frame of the consecutive image frames, and a fill light controller configured to adjust an illumination intensity of a fill light lamp for a next image frame based on the current automatic exposure parameter and a preset condition by increasing or decreasing the illumination intensity of the fill light lamp for the next image frame by a preset increment if the automatic exposure parameter does not satisfy the preset condition. The preset increment is pre-determined based on the current automatic exposure parameter.

25 Claims, 10 Drawing Sheets

(51) Int. Cl.
*G03B 15/05* (2006.01)
*H04N 5/235* (2006.01)
*H04N 5/243* (2006.01)
*H04N 9/73* (2006.01)
*H04N 9/77* (2006.01)

(52) U.S. Cl.
CPC ......... *H04N 5/2353* (2013.01); *H04N 5/2354* (2013.01); *H04N 5/243* (2013.01); *H04N 9/73* (2013.01); *H04N 9/77* (2013.01)

(56) References Cited

U.S. PATENT DOCUMENTS

| | | |
|---|---|---|
| 7,471,846 B2 | 12/2008 | Steinberg et al. |
| 10,171,749 B2 * | 1/2019 | Zhou .................... H04N 5/2354 |
| 10,477,116 B2 * | 11/2019 | Zhou ........................ H04N 9/77 |
| 2002/0118967 A1 | 8/2002 | Funston |
| 2003/0052991 A1 | 3/2003 | Stavely et al. |
| 2006/0193622 A1 | 8/2006 | Endo et al. |
| 2006/0204056 A1 | 9/2006 | Steinberg et al. |
| 2008/0298794 A1 | 12/2008 | Subbotin et al. |
| 2009/0268023 A1 | 10/2009 | Hsieh |
| 2016/0088228 A1 | 3/2016 | Tsai |

FOREIGN PATENT DOCUMENTS

| | | |
|---|---|---|
| CN | 101102416 A | 1/2008 |
| CN | 103488026 A | 1/2014 |
| CN | 104320593 A | 1/2015 |
| JP | 2002277934 A | 9/2002 |

\* cited by examiner

IMAGING DEVICE, METHOD AND SYSTEM OF PROVIDING FILL LIGHT, AND MOVABLE OBJECT

CROSS-REFERENCE TO RELATED APPLICATIONS

This application is a continuation application of application Ser. No. 16/216,018, filed on Dec. 11, 2018, which is a continuation application of application Ser. No. 15/722,473, now U.S. Pat. No. 10,171,749, filed on Oct. 2, 2017, which is a continuation application of International Application No. PCT/CN2015/075595, filed on Mar. 31, 2015, the entire contents of all of which are incorporated herein by reference.

TECHNICAL FIELD

The present disclosure relates to an imaging system, and in particular to an imaging device, a method and system of providing fill light for the imaging device, and a movable object.

BACKGROUND OF THE DISCLOSURE

A fill light can be required for an imaging system to capture images in a low illumination environment such as in the night. Existing imaging systems in mobile phones and cameras employ an automatic flash to provide a fill light. First, a conventional lighting is emitted to provide a tentative fill light, and an image quality under the tentative fill light is obtained using an imaging element such as a charge coupled device (CCD) image sensor. Then, parameters such as a focus and an exposure are adjusted in real-time through a computation, and thus an appropriate fill light is provided to capture an image having satisfactory image quality.

Digital devices such as mobile phones and cameras are designed to capture images having the best quality to meet user expectations, and therefore a series of processes have to be performed including providing a tentative fill light, detecting image quality, adjusting a focus and an exposure, providing an appropriate fill light and capturing an image. The series of processes can take a few seconds and significant computational resources are needed.

However, imaging systems of aerial vehicles and robots impose a high requirement on real time imaging processing in performing a continuous imaging. Due to limited computational resources of imaging systems of aerial vehicles and robots, the conventional method of providing fill light is inadequate in view of the large time delay and significant computational resource consumption. Therefore, the conventional method of providing fill light is not suitable for visual imaging systems in aerial vehicles and robots.

SUMMARY OF THE DISCLOSURE

There is a need for an imaging device having a less computational resource consumption and improved real time performance. There is also a need for a method and system of providing fill light for the imaging device.

An aspect of the disclosure discloses a method of providing fill light, said method comprising:
  obtaining an automatic exposure parameter of an image sensor; and
  controlling a fill light lamp to provide an automatic fill light based upon the automatic exposure parameter.

The method as described hereinabove can be advantageous in various aspects over conventional methods of providing fill light.

For instance, with the method of providing fill light as described hereinabove, an ambient illumination condition can be detected using an exposure parameter of the imaging system, and a fill light can be controlled based upon the automatic exposure parameter without detecting a quality of an image obtained in the presence of a tentative fill light. The computational resource consumption can be decreased and the real time performance can be improved.

For instance, with the method of providing fill light as described hereinabove, the automatic exposure parameter can be used as a feedback to a fill light parameter and there's no need to modify a configuration of the imaging system. Therefore, the method of present disclosure can be more suitable for a positioning and imaging system of an aerial vehicle than the conventional methods of providing a fill light.

In some embodiments, the automatic exposure parameter of the image sensor can comprise at least one of an automatic exposure time or an automatic exposure gain.

In some embodiments, controlling the fill light lamp to provide the automatic fill light can comprise:
  controlling a power switch of the fill light lamp based upon the automatic exposure parameter.

In some embodiments, controlling the power switch of the fill light lamp can comprise:
  turning off the power switch of the fill light lamp if the automatic exposure parameter satisfies a preset condition; and/or
  turning on the power switch of the fill light lamp if the automatic exposure parameter does not satisfy the preset condition.

In some embodiments, controlling the fill light lamp to provide the automatic fill light can comprise:
  controlling an illumination intensity of the fill light lamp based upon the automatic exposure parameter.

In some embodiments, controlling the illumination intensity of the fill light lamp can further comprise:
  maintaining the illumination intensity of the fill light lamp if the automatic exposure parameter satisfies a preset condition; and/or
  adjusting the illumination intensity of the fill light lamp if the automatic exposure parameter does not satisfy the preset condition.

In some embodiments, obtaining the automatic exposure parameter of the image sensor can comprise:
  obtaining an automatic exposure parameter of consecutive image frames.

In some embodiments, controlling the fill light lamp to provide the automatic fill light based upon the automatic exposure parameter can comprise:
  controlling the fill light lamp to provide the automatic fill light based upon the automatic exposure parameter of each image frame.

In some embodiments, the automatic exposure parameter of each image frame can be used to control the illumination intensity of the fill light lamp in obtaining a next image frame.

In some embodiments, a number of frames of the consecutive image frames can be less than a preset number of frames; and/or
  a frame rate of the consecutive image frames can be less than a preset frame rate.

In some embodiments, obtaining the automatic exposure parameter of the image sensor can comprise:

obtaining the automatic exposure parameter of a current image of the image sensor in real-time.

In some embodiments, controlling the fill light lamp to provide the automatic fill light based upon the automatic exposure parameter can comprise:

calculating an automatic fill light parameter of a next image based upon the automatic exposure parameter of the current image;

controlling in real-time the fill light lamp to provide a fill light based upon the automatic fill light parameter.

In some embodiments, said method can further comprise:

repeatedly performing the method of providing fill light until the image sensor stops obtaining images.

In some embodiments, the automatic fill light parameter can comprise at least one of a switch status of the fill light lamp or the illumination intensity of the fill light lamp.

In some embodiments, calculating the automatic fill light parameter of the next image can comprise:

adjusting the illumination intensity of the fill light of the next image by a preset increment if the automatic exposure parameter of the current image does not satisfy a preset condition.

In some embodiments, the preset increment can correspond to a preset automatic exposure parameter; or the preset increment can gradually decrease with an increasing number of consecutive adjustments of the illumination intensity of the fill light.

Another aspect of the disclosure discloses a system of providing fill light, said system comprising:

an exposure parameter acquisition module configured to obtain an automatic exposure parameter of an image sensor; and a fill light module configured to control a fill light lamp to provide an automatic fill light based upon the automatic exposure parameter.

In some embodiments, the automatic exposure parameter can comprise at least one of an automatic exposure time or an automatic exposure gain.

In some embodiments, the fill light module can comprise:

a power switch control module configured to control a power switch of the fill light lamp based upon the automatic exposure parameter.

In some embodiments, the power switch control module can be further configured to:

turn off the power switch of the fill light lamp if the automatic exposure parameter satisfies a preset condition; and/or turn on the power switch of the fill light lamp if the automatic exposure parameter does not satisfy the preset condition.

In some embodiments, the fill light module can comprise:

an illumination intensity control module configured to control an illumination intensity of the fill light lamp based upon the automatic exposure parameter.

In some embodiments, the illumination intensity control module can be further configured to:

maintain the illumination intensity of the fill light lamp if the automatic exposure parameter satisfies a preset condition; and/or adjust the illumination intensity of the fill light lamp if the automatic exposure parameter does not satisfy the preset condition.

In some embodiments, the exposure parameter acquisition module can be further configured to obtain an automatic exposure parameter of consecutive image frames.

In some embodiments, the fill light module can be further configured to control the fill light lamp to provide the automatic fill light based upon the automatic exposure parameter of each image frame.

In some embodiments, the automatic exposure parameter of each image frame can be used to control the illumination intensity of the fill light lamp in obtaining a next image frame.

In some embodiments, a number of frames of the consecutive image frames can be less than a preset number of frames; and/or a frame rate of the consecutive image frames can be less than a preset frame rate.

In some embodiments, the exposure parameter acquisition module can be configured to obtain the automatic exposure parameter of a current image of the image sensor in real-time.

In some embodiments, the fill light module can comprise:

a calculation module configured to calculate an automatic fill light parameter of a next image based upon the automatic exposure parameter of the current image;

a control module configured to control in real-time the fill light lamp to provide a fill light based upon the automatic fill light parameter.

In some embodiments, said system of providing fill light can further comprise:

an execution module configured to direct the exposure parameter acquisition module and the fill light module to repeatedly perform until the image sensor stops obtaining images.

In some embodiments, the automatic fill light parameter can comprise at least one of a switch status of the fill light lamp or the illumination intensity of the fill light lamp.

In some embodiments, the calculation module can be configured to:

adjust the illumination intensity of the fill light of the next image by a preset increment if the automatic exposure parameter of the current image does not satisfy a preset condition.

In some embodiments, the preset increment can correspond to a preset automatic exposure parameter; or the preset increment can gradually decrease with an increasing number of consecutive adjustments of the illumination intensity of the fill light.

Another aspect of the disclosure discloses an imaging device, comprising:

an image sensor configured to obtain images;

a fill light lamp configured to provide a fill light to an ambient environment of the image sensor; and a controller configured to obtain an exposure parameter of the image sensor and control the fill light lamp to provide an automatic fill light based upon the automatic exposure parameter.

In some embodiments, the automatic exposure parameter of the image sensor can comprise at least one of an automatic exposure time or an automatic exposure gain.

In some embodiments, the controller can be configured to control a power switch of the fill light lamp based upon the automatic exposure parameter.

In some embodiments, the controller can be configured to turn off the power switch of the fill light lamp if the automatic exposure parameter satisfies a preset condition; and/or the controller can be configured to turn on the power switch of the fill light lamp if the automatic exposure parameter does not satisfy the preset condition.

In some embodiments, the controller can be configured to control an illumination intensity of the fill light lamp based upon the automatic exposure parameter.

In some embodiments, the controller can be configured to control the fill light lamp to maintain the illumination intensity if the automatic exposure parameter satisfies a preset condition; and/or the controller can be configured to control the fill light lamp to adjust the illumination intensity if the automatic exposure parameter does not satisfy the preset condition.

In some embodiments, the controller can be configured to obtain an automatic exposure parameter of consecutive image frames.

In some embodiments, the controller can be further configured to control the fill light lamp to provide the automatic fill light based upon the automatic exposure parameter of each image frame.

In some embodiments, a frame rate of the consecutive image frames can be 10 Hz to 20 Hz.

In some embodiments, a number of frames of the consecutive image frames can be less than a preset number of frames; and/or a frame rate of the consecutive image frames can be less than a preset frame rate.

In some embodiments, the controller can be configured to obtain the automatic exposure parameter of a current image of the image sensor in real-time.

In some embodiments, the controller can be further configured to calculate an automatic fill light parameter of a next image based upon the automatic exposure parameter of the current image, and to control in real-time the fill light lamp to provide a fill light based upon the automatic fill light parameter.

In some embodiments, the automatic fill light parameter can comprise at least one of a switch status of the fill light lamp or the illumination intensity of the fill light lamp.

In some embodiments, the controller can be configured to adjust the illumination intensity of the fill light of the next image by a preset increment if the automatic exposure parameter of the current image does not satisfy a preset condition.

In some embodiments, the preset increment can correspond to a preset automatic exposure parameter; or the preset increment can gradually decrease with an increasing number of consecutive adjustments of the illumination intensity of the fill light.

The disclosure also provides a movable object having the imaging device.

Another aspect of the disclosure discloses a movable object, comprising:

the imaging device as described hereinabove; and a processor configured to process images obtained by the imaging device.

In some embodiments, the movable object can be an unmanned aerial vehicle or a robot.

LIST OF REFERENCE NUMERALS

TABLE 1

Figure 1:
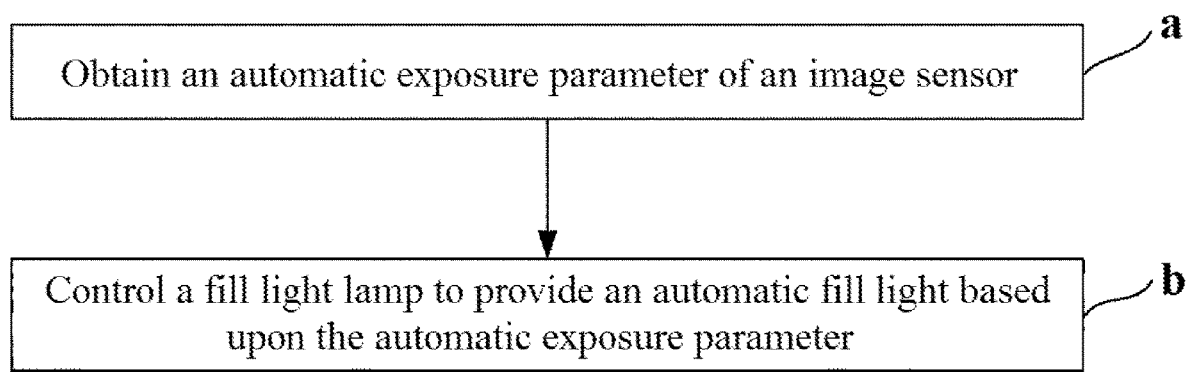
FIG. 1 is a flowchart of a method of providing fill light in accordance with embodiments of the disclosure.

| Step | a, b, S101, S102, S103, S104, S105, S106, S201, S202, S203, S204, S205, S206, S207, S208, S209, S210, S301, S302, S303, S304, S305, S306, S307, S308, S309, S310 |
|---|---|
| System of providing fill light | 100 |
| Exposure parameter acquisition module | 110 |
| Automatic exposure unit | 111 |
| Exposure parameter acquisition unit | 113 |
| Fill light module | 120 |
| Illumination intensity control module | 121 |
| Power switch control module | 123 |
| Exposure parameter determination unit | 221, 321 |
| Illumination intensity maintaining unit | 223, 323, 423 |
| Illumination intensity adjustment unit | 225, 325, 425 |
| Automatic fill light unit | 227 |
| First fill light illumination determination unit | 322 |
| Second fill light illumination determination unit | 326 |
| Fill light lamp switching-off unit | 324, 424 |
| Fill light lamp switching-on unit | 328, 428 |
| Automatic fill light unit | 327 |
| Fill light illumination determination unit | 422 |
| First exposure parameter determination unit | 421 |
| Second exposure parameter determination unit | 426 |
| Automatic fill light unit | 427 |
| Imaging device | 200 |
| Image sensor | 210 |
| Fill light lamp | 220 |
| Controller | 230 |
| Processor | 300 |
| Movable object | 10 |

DETAILED DESCRIPTION OF THE DISCLOSURE

A better understanding of the disclosure will be obtained by reference to the following detailed description that sets forth illustrative embodiments with reference to the drawings. It will be apparent that, the embodiments described herein are merely provided by way of example only. Those skilled in the art can conceive other embodiments in light of those embodiments disclosed herein without inventive efforts, and all these embodiments are within the scope of the disclosure.

It is apparent that, if a component is described as "being fixed to" another component, it can be directly fixed to the other component, or an intermediate component can be provided therebetween. If a component is described as "being coupled to" another component, it can be directly coupled to the other component, or an intermediate component can be provided therebetween. Terms such as "vertical", "horizontal", "left", "right", as used in the disclosure, are merely illustrative.

Unless otherwise defined, technical and scientific terms, as used in the disclosure, have the same meaning as commonly understood by those skilled in the field of the disclosure. The terms as used in the disclosure are intended to illustrate the embodiments, not to limit the disclosure. The term "and/or", as used in the disclosure, comprises any and all combinations of one or more items as listed.

Embodiments of the disclosure provide a method of providing fill light. The method can control a fill light lamp to provide an automatic fill light based upon an automatic exposure parameter of an image sensor.

In some embodiments, the method of providing fill light can control the fill light lamp to be switched on or off based upon the automatic exposure parameter of the image sensor. For instance, a power switch of the fill light lamp can be turned off if the automatic exposure parameter satisfies a preset condition. Otherwise, the power switch of the fill light lamp can be turned on if the automatic exposure parameter does not satisfy the preset condition.

In some embodiments, the method of providing fill light can control an illumination intensity of the fill light lamp based upon the automatic exposure parameter of the image sensor. For instance, the illumination intensity of the fill light lamp can be maintained if the automatic exposure parameter satisfies a preset condition. Otherwise, the illumination intensity of the fill light lamp can be adjusted if the automatic exposure parameter does not satisfy the preset condition.

In some embodiments, an automatic exposure parameter of each image frame can be used to control the illumination intensity of the fill light lamp in capturing a next image frame. The fill light lamp can be controlled to provide an automatic fill light based upon the automatic exposure parameter of each image frame in consecutive image frames.

In some embodiments, the number of frames of the consecutive image frames can be less than a preset number of frames. For example, the number of frames of the consecutive image frames can be less than 100.

In some embodiments, a frame rate of the consecutive image frames can be less than a preset frame rate. For example, the frame rate of the consecutive image frames can be less than 100 Hz. In an illustrative embodiment, the frame rate of the consecutive image frames can be 10 Hz to 20 Hz.

In some embodiments, the automatic exposure parameter of each image frame can be used to control the illumination intensity of the fill light lamp in capturing the next image frame.

Based upon the method of providing fill light, embodiments of the disclosure also provide an imaging device embodying the method of providing fill light.

The imaging device can comprise an image sensor, a fill light lamp and a controller. The image sensor can capture an image. The fill light lamp can provide a fill light to an external environment of the image sensor. The controller can obtain an automatic exposure parameter of the image sensor, and control the fill light lamp to provide an automatic fill light based upon the automatic exposure parameter.

Illustrative embodiments of the disclosure will be described with reference to the drawings. The embodiments and features can be combined with one another provided that they are technically compatible.

Referring to FIG. 1, a method of providing fill light in accordance with embodiments of the disclosure can comprise steps a and b.

In step a, an automatic exposure parameter of an image sensor can be obtained.

In some embodiments, an automatic exposure parameter of a current image of the image sensor can be obtained in real-time.

The automatic exposure parameter of the image sensor can comprise an automatic exposure time and an automatic exposure gain. In some embodiments, one of the automatic exposure time and the automatic exposure gain can be selected as a reference parameter in controlling a fill light lamp. Alternatively, the automatic exposure time and the automatic exposure gain can both be selected as reference parameters in controlling the fill light lamp.

The process of obtaining the automatic exposure parameter of the image sensor can be implemented with various approaches. For instance, taking the consecutive image frames shown in FIG. 2 as an example, step a can comprise the following steps.

In step S101, an automatic exposure can be performed by an imaging system when the image sensor captures each image frame of the consecutive image frames.

In capturing images in different external environments (for example, in daylight or at night), the image sensor can automatically adjust an exposure based upon an intensity of ambient light to prevent an overexposure or an underexposure. In other words, the image sensor can perform an automatic exposure based upon a sensed intensity of ambient light.

In some embodiments, the image sensor can perform a continuous exposure in obtaining the consecutive image frames, where an automatic exposure time and an automatic exposure gain of each automatic exposure can be automatically adjusted based upon an intensity of ambient light in obtaining each image frame.

In step S102, an automatic exposure parameter of each image frame can be obtained.

In some embodiments, an automatic exposure parameter of each image frame can be obtained in capturing each image frame of the consecutive image frames. In some instances, an automatic exposure time and an automatic exposure gain of each image frame can be obtained.

In step b, the fill light lamp can be controlled to provide an automatic fill light based upon the automatic exposure parameter.

When the fill light lamp is used to provide a fill light illumination, a determination to decrease an illumination intensity of the fill light can be made if the automatic exposure time of the imaging system is relatively short and the exposure gain is relatively low. Likewise, a determination to increase the illumination intensity of the fill light can be made if the automatic exposure time is relatively long and the automatic exposure gain is relatively high.

It will be appreciated that, the illumination intensity of the fill light lamp can be controlled based upon the automatic exposure parameter, such that the illumination intensity of the fill light lamp can be rapidly adjusted based upon the automatic exposure parameter to control the fill light lamp in real-time.

The process of controlling the illumination intensity of the fill light lamp based upon the automatic exposure parameter can be implemented with various approaches. In some embodiments, the illumination intensity of the fill light lamp can be maintained if the automatic exposure parameter satisfies a preset condition, and the illumination intensity of the fill light lamp can be adjusted if the automatic exposure parameter does not satisfy the preset condition. For instance, the illumination intensity of the fill light lamp can be increased if the automatic exposure parameter is above a preset exposure parameter range, and the illumination intensity of the fill light lamp can be decreased if the automatic exposure parameter is below the preset exposure parameter range. The illumination intensity of the fill light lamp can be maintained if the automatic exposure parameter is within the preset exposure parameter range.

When the fill light lamp is not used, the automatic exposure time of the imaging system can be relatively short and the exposure gain can be low if an illumination of the external environment of the image sensor is relatively intense. In this situation, a determination that the fill light illumination is not needed can be made automatically, and the fill light lamp can be switched off. On the other hand, the automatic exposure time and the automatic exposure gain can be significantly increased if the external environment of the image sensor is dim and the illumination is insufficient. In this situation, a determination that the fill light illumination is needed can be made automatically, and the fill light lamp can be switched on.

It will be appreciated that, the automatic exposure parameter can be used as a control parameter of the fill light lamp to automatically control a power switch of the fill light lamp, such that the fill light lamp can be timely switched off if it is not to be used. An energy consumption can be reduced and a service time of the fill light lamp can be extended.

The process of controlling the power switch of the fill light lamp based upon the automatic exposure parameter can be implemented with various approaches. In some embodiments, the power switch of the fill light lamp can be turned off if the automatic exposure parameter satisfies a preset condition, and the power switch of the fill light lamp can be turned on if the automatic exposure parameter does not satisfy the preset condition. For instance, the power switch of the fill light lamp can be turned off if the automatic exposure parameter is below a preset threshold, and the power switch of the fill light lamp can be turned on if the automatic exposure parameter is above the preset threshold.

It will be appreciated that, the preset threshold can be a value or a value range. The preset threshold can be set by a user. Optionally, the preset threshold can be automatically set by the imaging system.

In some embodiments, the process of controlling the fill light lamp to provide an automatic fill light based upon the automatic exposure parameter can comprise the following steps.

In a step, an automatic fill light parameter of a next image can be calculated based upon an automatic exposure parameter of a current image;

In a further step, the fill light lamp can be controlled in real-time to provide a fill light based upon the automatic fill light parameter.

In some instances, the automatic fill light parameter can comprise at least one of a switch status of the fill light lamp or an illumination intensity of the fill light lamp.

In some instances, an illumination intensity of fill light of the next image can be adjusted by a preset increment if (1) the automatic fill light parameter is the illumination intensity of the fill light lamp, and (2) the automatic exposure parameter of the current image does not satisfy a preset condition.

It will be appreciated that, the preset increment can correspond to a preset automatic exposure parameter. In some embodiments, different preset increments can correspond to different preset automatic exposure parameter ranges. For instance, a preset increment L1 can correspond to a preset automatic exposure parameter range A1~A2, and a preset increment L2 can correspond to a preset automatic exposure parameter range A2~A3. The preset increment L1 can be used if the automatic exposure parameter B of the current image is within the range A1~A2, and the preset increment L2 can be used if the automatic exposure parameter B of the current image is within the range A2~A3.

Alternatively, different preset increments can correspond to different individual preset automatic exposure parameter values. For instance, preset increments L1, L2, L3 and L4 can respectively correspond to preset automatic exposure values A1, A2, A3 and A4. The preset increment L1 can be used if the automatic exposure parameter of the current image is A1, and the preset increment L2 can be used if the automatic exposure parameter of the current image is A2, and so forth.

The preset increments can gradually decrease with an increasing number of consecutive adjustments of the illumination intensity of the fill light. For instance, the preset increments L1, L2 and L3 can gradually decrease in this order. The increment L1 can be used when a first adjustment of the illumination intensity of the fill light is performed, the increment L2 can be used when a second adjustment of the illumination intensity of the fill light is performed, and the increment L3 can be used when a third adjustment of the illumination intensity of the fill light is performed.

The step b will be described in connection with various embodiments, taking consecutive frames of a video as an example.

Figure 2:
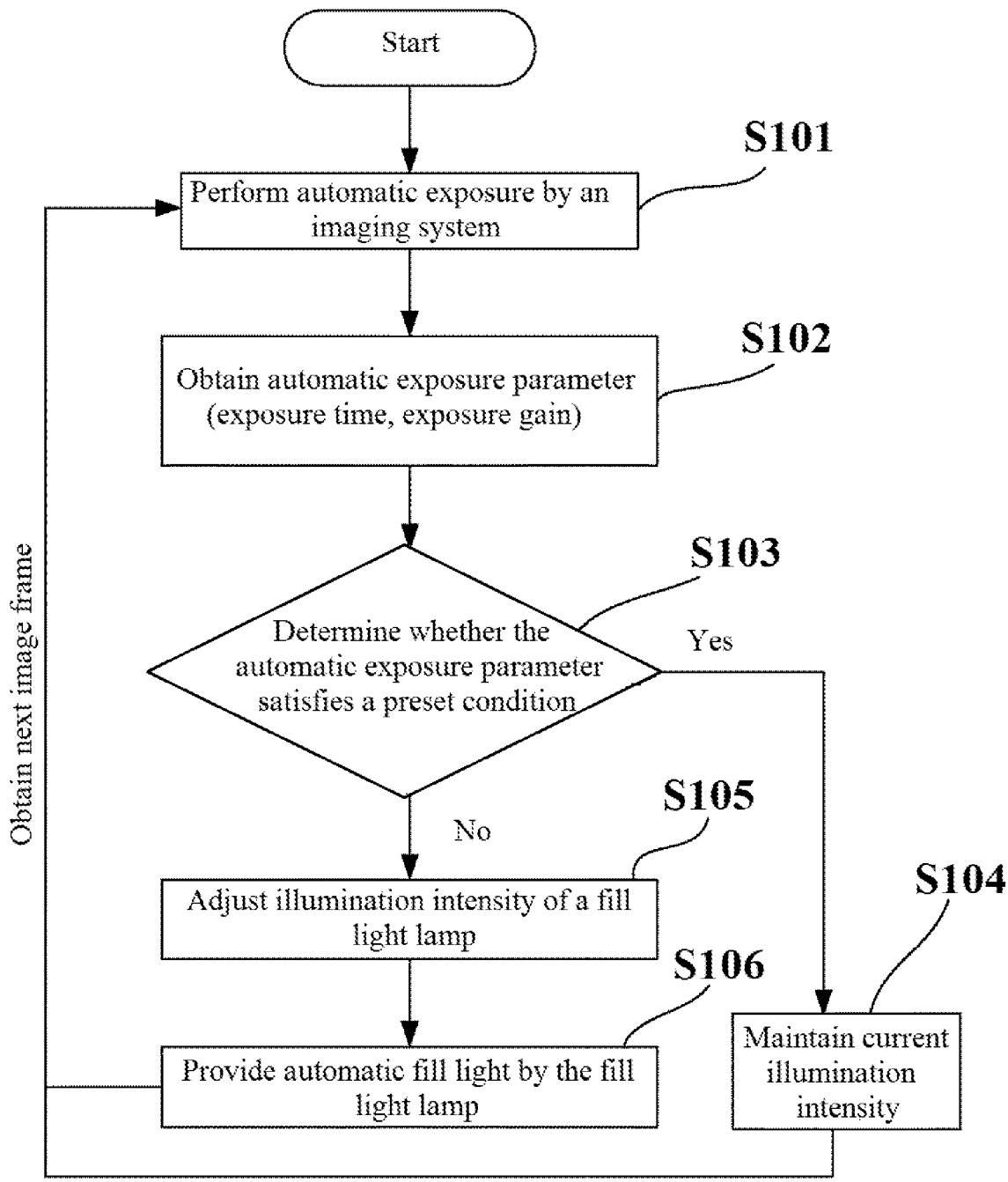
FIG. 2 is a flowchart of an example of the method of providing fill light in FIG. 1.

In some embodiments, as shown in FIG. 2, the process of controlling the fill light lamp to provide the automatic fill light based upon the automatic exposure parameter can comprise steps S103 to S105.

In step S103, a determination on whether the automatic exposure parameter satisfies a preset condition can be made.

In some embodiments, a determination on whether the automatic exposure time and the automatic exposure gain of the image sensor are within a preset exposure time range and a preset automatic exposure gain range can be made. The preset exposure time range and the preset automatic exposure gain range can correspond to a high quality image captured by the image sensor.

In step S104, a current illumination intensity can be maintained if the automatic exposure parameter satisfies the preset condition.

In some embodiments, a current automatic exposure time and a current automatic exposure gain of the image sensor can be maintained if the automatic exposure time and the automatic exposure gain of the image sensor are within the preset exposure time range and the preset automatic exposure gain range.

In step S105, the illumination intensity of the fill light lamp can be adjusted if the automatic exposure parameter does not satisfy the preset condition.

In some embodiments, a current illumination intensity of the fill light lamp can be adjusted if the automatic exposure time and the automatic exposure gain of the image sensor are not within the preset exposure time range and the preset automatic exposure gain range. For instance, the illumination intensity of the fill light lamp can be decreased if the automatic exposure time and the automatic exposure gain of the image sensor are below the preset exposure time range and the preset automatic exposure gain range. For instance, the illumination intensity of the fill light lamp can be increased if the automatic exposure time and the automatic exposure gain of the image sensor are above the preset exposure time range and the preset automatic exposure gain range.

In step S106, the automatic fill light can be provided by the fill light lamp at the adjusted illumination intensity.

The steps as discussed hereinabove can be performed if a next image frame is to be obtained.

Figure 3:
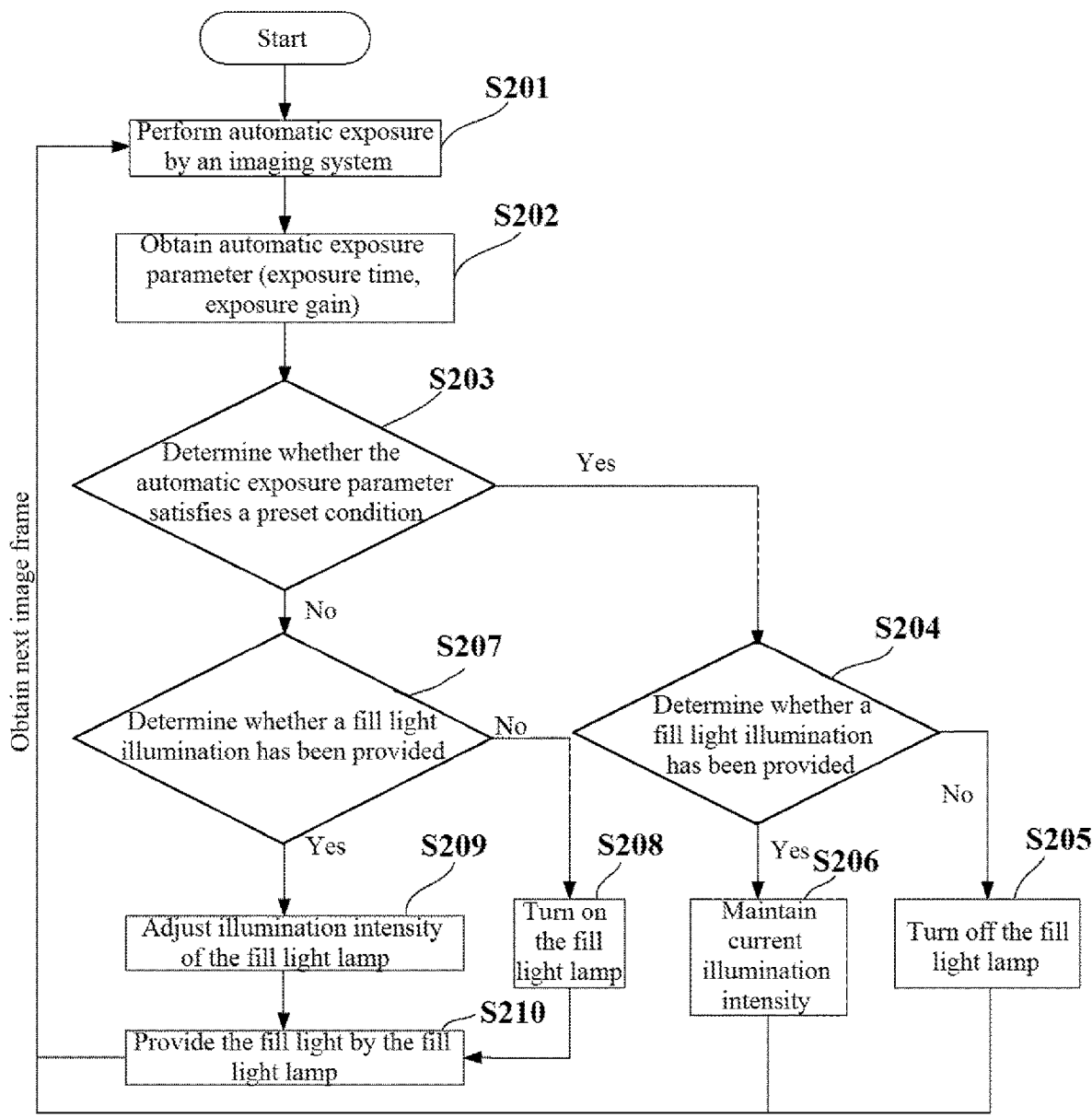
FIG. 3 is a flowchart of another example of the method of providing fill light in FIG. 1.

In some embodiments, as shown in FIG. 3, the process of controlling the fill light lamp to provide an automatic fill light based upon the automatic exposure parameter can comprise steps S203 to S210.

In step S203, a determination on whether the automatic exposure parameter satisfies a preset condition can be made.

In some embodiments, a determination on whether the automatic exposure time and the automatic exposure gain of the image sensor are within a preset exposure time range and a preset automatic exposure gain range can be made. The preset exposure time range and the preset automatic exposure gain range can correspond to a high quality image captured by the image sensor.

In step S204, a determination on whether the fill light lamp has provided a fill light illumination can be made if the automatic exposure parameter satisfies the preset condition.

In some embodiments, a determination on whether a fill light illumination has been provided in obtaining the image frame can be made if the automatic exposure time and the automatic exposure gain of the image sensor are within the preset exposure time range and the preset automatic exposure gain range.

In step S205, the fill light lamp can be switched off if the fill light lamp has not provided the fill light illumination and the automatic exposure parameter satisfies the preset condition.

In some embodiments, the power switch of the fill light lamp can be switched off if the fill light lamp has not provided fill light illumination in obtaining the image frame by the image sensor and the automatic exposure time and the automatic exposure gain of the image sensor are within the preset exposure time range and the preset automatic exposure gain range. In this case, an illumination condition of ambient environment of the image sensor can be satisfactory, therefore there's no need to provide the fill light illumination. An energy consumption can be reduced and a service time of the fill light lamp can be extended.

In step S206, the current illumination intensity can be maintained if the fill light lamp has provided the fill light illumination and the automatic exposure parameter satisfies the preset condition.

In some embodiments, the current illumination intensity of the fill light lamp can be maintained if the fill light lamp has provided fill light illumination in obtaining the image frame by the image sensor and the automatic exposure time and the automatic exposure gain of the image sensor are within the preset exposure time range and the preset automatic exposure gain range. In this case, the current illumination intensity of the fill light lamp can be appropriate, therefore there's no need to further adjust the illumination intensity.

In step S207, a determination on whether the fill light lamp has provided the fill light illumination can be made if the automatic exposure parameter does not satisfy the preset condition.

In some embodiments, a determination on whether the fill light illumination has been provided in obtaining the image frame by the image sensor can be made and the automatic exposure time and the automatic exposure gain of the image sensor are not within the preset exposure time range and the preset automatic exposure gain range.

In step S208, the fill light lamp can be switched on if the fill light lamp has not provided the fill light illumination and the automatic exposure parameter does not satisfy the preset condition.

In some embodiments, the fill light lamp can be switched on to provide fill light if the fill light lamp has not provided fill light illumination in obtaining the image frame by the image sensor and the automatic exposure time and the automatic exposure gain of the image sensor are not within the preset exposure time range and the preset automatic exposure gain range. In this case, an illumination condition of ambient environment of the image sensor can be unsatisfactory.

In step S209, the illumination intensity of the fill light lamp can be adjusted if the fill light lamp has provided the fill light illumination and the automatic exposure parameter does not satisfy the preset condition.

In some embodiments, the current illumination intensity of the fill light lamp can be adjusted if the fill light lamp has provided fill light illumination in obtaining the image frame by the image sensor and the automatic exposure time and the automatic exposure gain of the image sensor are not within the preset exposure time range and the preset automatic exposure gain range. In this case, the current illumination intensity of the fill light lamp can be inappropriate for current ambient environment.

For instance, the illumination intensity of the fill light lamp can be decreased if the automatic exposure time and the automatic exposure gain of the image sensor are below the preset exposure time range and the preset automatic exposure gain range. For instance, the illumination intensity of the fill light lamp can be increased if the automatic exposure time and the automatic exposure gain of the image sensor are above the preset exposure time range and the preset automatic exposure gain range.

In step S210, the automatic fill light can be provided by the fill light lamp at the adjusted illumination intensity.

The steps as discussed hereinabove can be performed if a next image frame is to be obtained.

Figure 4:
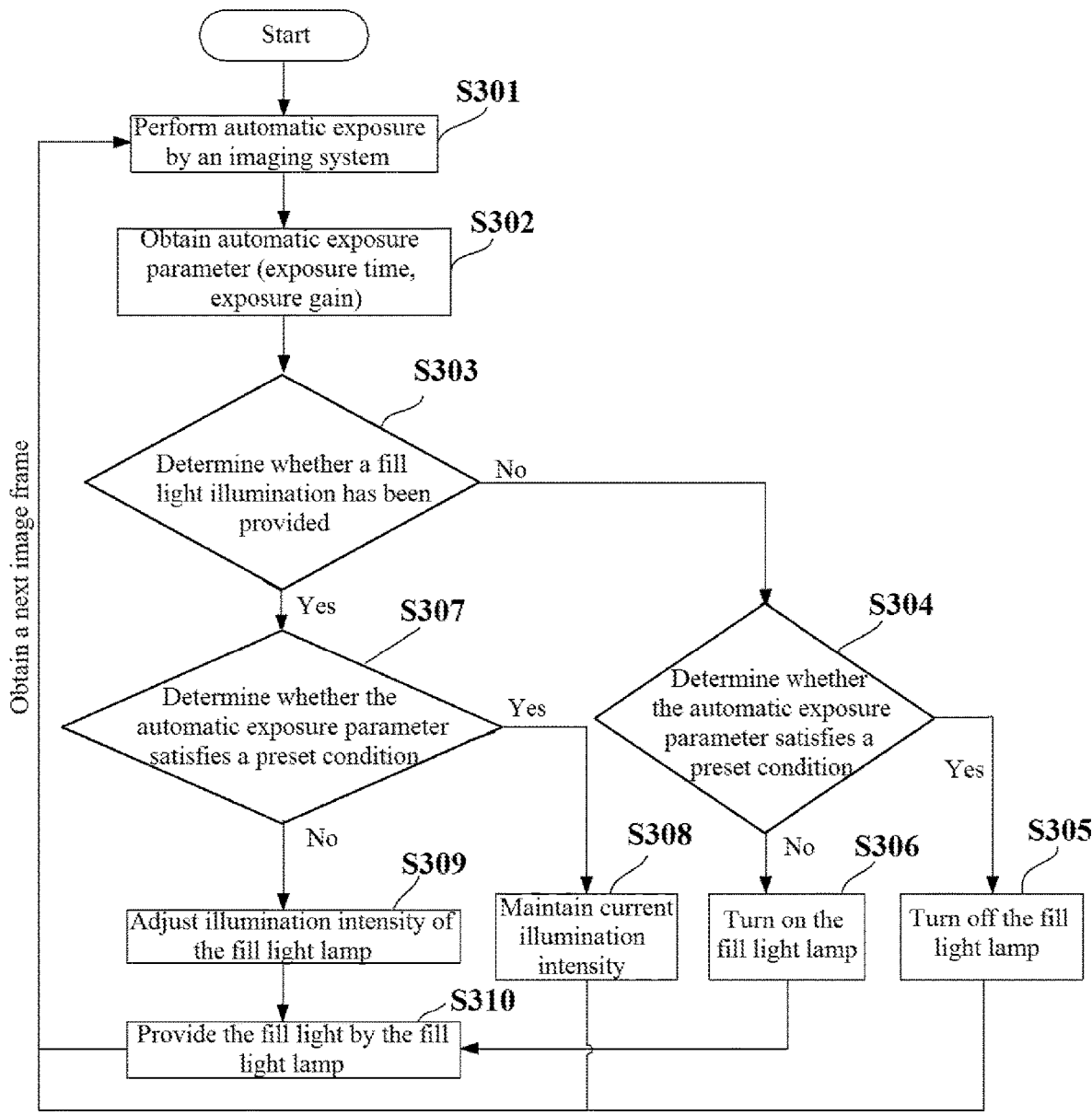
FIG. 4 is a flowchart of yet another example of the method of providing fill light in FIG. 1.

In some embodiments, as shown in FIG. 4, the process of controlling the fill light lamp to provide an automatic fill light based upon the automatic exposure parameter can comprise steps S303 to S310.

In step S303, a determination on whether the fill light lamp has provided a fill light illumination can be made.

In some instances, a determination on whether the fill light lamp has provided the fill light illumination in obtaining the image frame by the image sensor can be made.

In step S304, a determination on whether the automatic exposure parameter satisfies a preset condition can be made if the fill light lamp has not provided the fill light illumination.

In some embodiments, a determination on whether the automatic exposure time and the automatic exposure gain of the image sensor are within a preset exposure time range and a preset automatic exposure gain range can be made if the fill light lamp has not provided the fill light illumination in obtaining the image frame by the image sensor.

In step S305, the fill light lamp can be switched off if the automatic exposure parameter satisfies the preset condition and the fill light lamp has not provided the fill light illumination.

In some embodiments, the power switch of the fill light lamp can be switched off if the fill light lamp has not provided fill light illumination in obtaining the image frame by the image sensor and the automatic exposure time and the automatic exposure gain of the image sensor are within the preset exposure time range and the preset automatic exposure gain range. In this case, an illumination condition of ambient environment of the image sensor can be satisfactory, therefore there's no need to provide the fill light illumination. An energy consumption can be reduced and a service time of the fill light lamp can be extended.

In step S306, the fill light lamp can be switched on if the automatic exposure parameter does not satisfy the preset condition and the fill light lamp has not provided the fill light illumination.

In some embodiments, the fill light lamp can be switched on to provide the fill light illumination if the fill light lamp has not provided fill light illumination in obtaining the image frame by the image sensor and the automatic exposure time and the automatic exposure gain of the image sensor are not within the preset exposure time range and the preset automatic exposure gain range. In this case, an illumination condition of ambient environment of the image sensor can be unsatisfactory.

In step S307, a determination on whether the automatic exposure parameter satisfies the preset condition can be made if the fill light lamp has provided the fill light illumination.

In some embodiments, a determination on whether the automatic exposure time and the automatic exposure gain of the image sensor are within the preset exposure time range and the preset automatic exposure gain range can be made if the fill light illumination has been provided in obtaining the image frame by the image sensor.

In step S308, the current illumination intensity can be maintained if the automatic exposure parameter satisfies the preset condition and the fill light lamp has provided the fill light illumination.

In some embodiments, the current illumination intensity of the fill light lamp can be maintained if the fill light lamp has provided fill light illumination in obtaining the image frame by the image sensor and the automatic exposure time and the automatic exposure gain of the image sensor are within the preset exposure time range and the preset automatic exposure gain range. In this case, the current illumination intensity of the fill light lamp can be appropriate, therefore there's no need to further adjust the illumination intensity.

In step S309, the illumination intensity of the fill light can be adjusted if the automatic exposure parameter does not satisfy the preset condition and the fill light lamp has provided the fill light illumination.

In some embodiments, the current illumination intensity of the fill light lamp can be adjusted if the fill light lamp has provided fill light illumination in obtaining the image frame by the image sensor and the automatic exposure time and the automatic exposure gain of the image sensor are not within the preset exposure time range and the preset automatic exposure gain range. In this case, the current illumination intensity of the fill light lamp can be inappropriate for current ambient environment.

For instance, the illumination intensity of the fill light lamp can be decreased if the automatic exposure time and the automatic exposure gain of the image sensor are below the preset exposure time range and the preset automatic exposure gain range. For instance, the illumination intensity of the fill light lamp can be increased if the automatic exposure time and the automatic exposure gain of the image sensor are above the preset exposure time range and the preset automatic exposure gain range.

In step S310, the automatic fill light can be provided by the fill light lamp at the adjusted illumination intensity.

The steps as discussed hereinabove can be performed if a next image frame is to be obtained.

It will be appreciated that, a sequence of performing the process in which a determination on whether the fill light illumination has been provided is made and the process in which a determination on whether the automatic exposure parameter satisfies the preset condition is made is not limited to the example described in the illustrated embodiments. In some instances, the processes can be performed simultaneously.

It will be appreciated that, the automatic exposure parameter as obtained in the process in which the automatic exposure parameter is obtained is not limited to the exposure parameter of consecutive image frames. In some instances, the automatic exposure parameter can include the automatic exposure parameter of any image frame in the consecutive image frames. Optionally, the automatic exposure parameter can include the automatic exposure parameter of non-consecutive image frames.

The method as described hereinabove can be advantageous in various aspects over conventional methods of providing fill light.

For instance, with the method of providing fill light as described hereinabove, an ambient illumination condition can be detected using an exposure parameter of the imaging system, and a fill light can be controlled based upon the automatic exposure parameter without detecting a quality of an image obtained in the presence of a tentative fill light. The computational resource consumption can be decreased and the real time performance can be improved.

For instance, with the method of providing fill light as described hereinabove, the automatic exposure parameter can be used as a feedback to a fill light parameter and there's no need to modify a configuration of the imaging system. Therefore, the method of present disclosure can be more suitable for a positioning and imaging system of an aerial vehicle than the conventional methods of providing a fill light.

Figure 5:
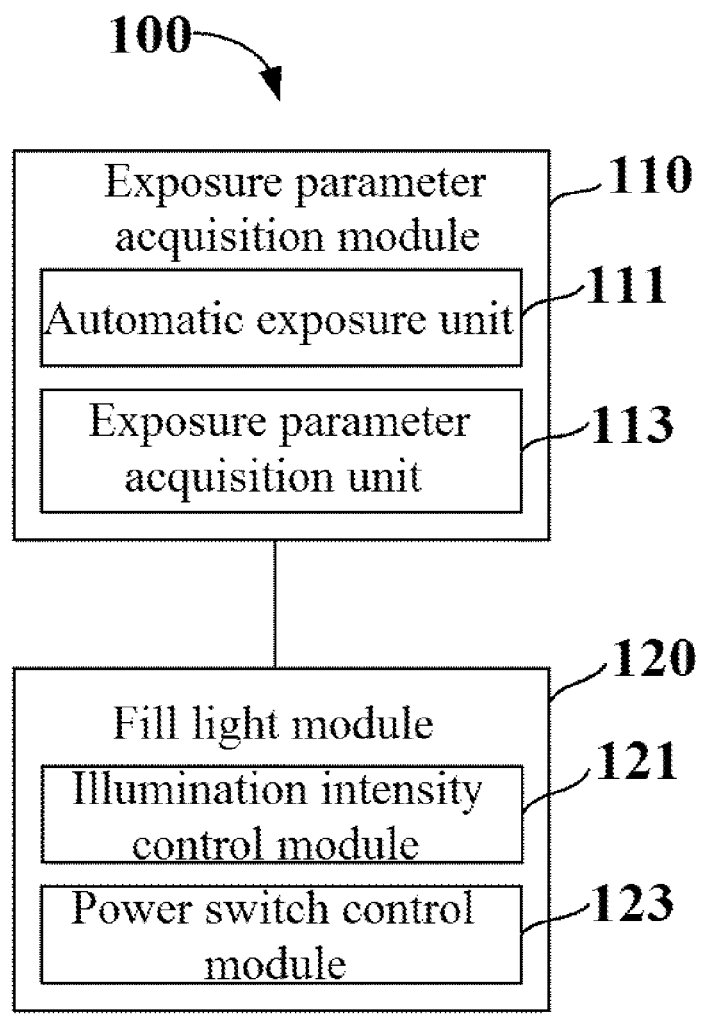
FIG. 5 shows a block diagram of a system of providing fill light in accordance with embodiments of the disclosure.

Referring to FIG. 5, the disclosure provides a system of providing fill light 100 based upon the method of providing fill light as discussed hereinabove. The system of providing fill light 100 can comprise an exposure parameter acquisition module 110 and a fill light module 120.

The exposure parameter acquisition module 110 can be configured to obtain an automatic exposure parameter of an image sensor. For instance, the exposure parameter acquisition module 110 can be configured to obtain an automatic exposure parameter of consecutive image frames.

In some embodiments, the exposure parameter acquisition module 110 can be configured to obtain an automatic exposure parameter of a current image of the image sensor in real-time.

The automatic exposure parameter of the image sensor can comprise an automatic exposure time and an automatic exposure gain. In some embodiments, one of the automatic exposure time and the automatic exposure gain can be selected as a reference parameter in controlling a fill light lamp. Alternatively, the automatic exposure time and the automatic exposure gain can both be selected as reference parameters in controlling the fill light lamp.

The exposure parameter acquisition module 110 can be provided with various approaches. In some embodiments, the exposure parameter acquisition module 110 can comprise an automatic exposure unit 111 and an exposure parameter acquisition unit 113. The automatic exposure unit 111 can be configured to provide an automatic exposure to an imaging system when the image sensor captures each image frame of the consecutive image frames. The exposure parameter acquisition unit 113 can be configured to obtain an automatic exposure parameter of each image frame.

In some instances, a frame rate of the consecutive image frames can be 10 Hz to 20 Hz. The number of frames of the consecutive image frames can be less than 100.

In some instances, the automatic exposure parameter of each image frame can be used to control an illumination intensity of the fill light lamp in obtaining a next image frame.

The fill light module 120 be configured to can control the fill light lamp to provide an automatic fill light based upon the automatic exposure parameter. For instance, the fill light module 120 can be configured to control the fill light lamp to provide the automatic fill light based upon the automatic exposure parameter of each image frame.

In some embodiments, the fill light module can comprise a calculation module and a control module. The calculation module can be configured to calculate an automatic fill light parameter of a next image based upon an automatic exposure parameter of a current image. The control module can be configured to control the fill light lamp in real-time to provide the fill light based upon the automatic fill light parameter.

In some embodiments, the system of providing fill light 100 can comprise an execution module. The execution module can direct the exposure parameter acquisition module and the fill light module to repeatedly perform the processing until the image sensor stops obtaining images.

In some instances, the automatic fill light parameter can comprise at least one of a switch status of the fill light lamp or an illumination intensity of the fill light lamp.

In some instances, the calculation module can adjust the illumination intensity of fill light for the next image by a preset increment if the automatic exposure parameter of the current image does not satisfy a preset condition.

It will be appreciated that, the preset increment can correspond to a preset automatic exposure parameter. In some embodiments, different preset increments can correspond to different preset automatic exposure parameter ranges. For instance, a preset increment L1 can correspond to a preset automatic exposure parameter range A1~A2, and a preset increment L2 can correspond to a preset automatic exposure parameter range A2~A3. The preset increment L1 can be used if the automatic exposure parameter B of the current image is within the range A1~A2, and the preset increment L2 can be used if the automatic exposure parameter B of the current image is within the range A2~A3.

Alternatively, different preset increments can correspond to different individual preset automatic exposure parameter values. For instance, preset increments L1, L2, L3 and L4 can respectively correspond to preset automatic exposure values A1, A2, A3 and A4. The preset increment L1 can be used if the automatic exposure parameter of the current image is A1, and the preset increment L2 can be used if the automatic exposure parameter of the current image is A2, and so forth.

The preset increments can gradually decrease with an increasing number of consecutive adjustments of the illumination intensity of the fill light. For instance, the preset increments L1, L2 and L3 can gradually decrease in this order. The increment L1 can be used when a first adjustment of the illumination intensity of the fill light is performed, the increment L2 can be used when a second adjustment of the illumination intensity of the fill light is performed, and the increment L3 can be used when a third adjustment of the illumination intensity of the fill light is performed.

When the fill light lamp is used to provide a fill light illumination, a determination to decrease an illumination intensity of the fill light can be made if the automatic exposure time of the imaging system is relatively short and the exposure gain is relatively low. Likewise, a determination to increase the illumination intensity of the fill light can be made if the automatic exposure time is relatively long and the automatic exposure gain is relatively high.

It will be appreciated that, the fill light module 120 can comprise an illumination intensity control module 121. The illumination intensity control module 121 can be configured to control the illumination intensity of the fill light lamp based upon the automatic exposure parameter, such that the illumination intensity of the fill light lamp can be rapidly adjusted based upon the automatic exposure parameter to control the fill light lamp in real-time.

In some instances, the illumination intensity control module 121 can be configured to maintain the illumination intensity of the fill light lamp if the automatic exposure parameter satisfies a preset condition, and to adjust the illumination intensity of the fill light lamp if the automatic exposure parameter does not satisfy the preset condition.

When the fill light lamp is not used, the automatic exposure time of the imaging system can be relatively short and the exposure gain can be low if an illumination of the external environment of the image sensor is relatively intense. In this situation, a determination that the fill light illumination is not needed can be made automatically, and the fill light lamp can be switched off. On the other hand, the automatic exposure time and the automatic exposure gain can be significantly increased if the external environment of the image sensor is dim and the illumination is insufficient. In this situation, a determination that the fill light illumination is needed can be made automatically, and the fill light lamp can be switched on.

It will be appreciated that, the fill light module 120 can comprise a power switch control module 123. The power switch control module 123 can be configured to control a power switch of the fill light lamp based upon the automatic exposure parameter, such that the fill light lamp can be timely switched off if it is not to be used. An energy consumption can be reduced and a service time of the fill light lamp can be extended.

In some instances, the power switch control module 123 can be configured to turn off the power switch of the fill light lamp if the automatic exposure parameter satisfies a preset condition, and to turn on the power switch of the fill light lamp if the automatic exposure parameter does not satisfy the preset condition.

Figure 6:
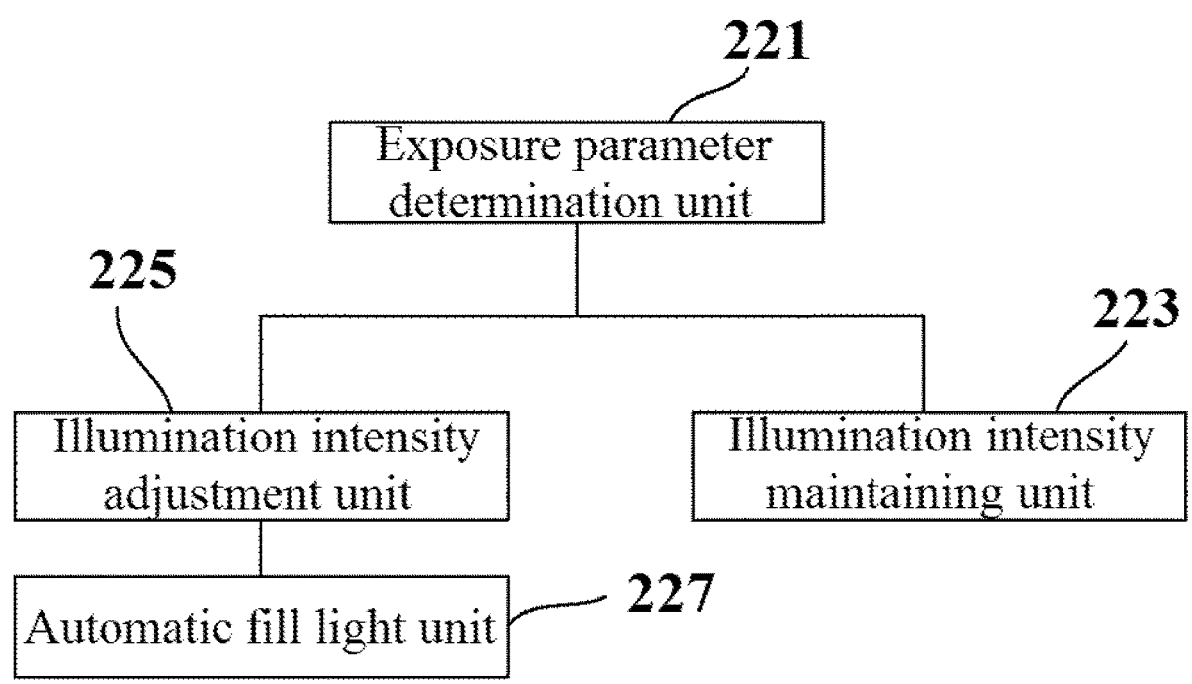
FIG. 6 is a block diagram of an example of the system of providing fill light in FIG. 5.

The fill light module 120 can be provided with various approaches. In some embodiments, as shown in FIG. 6, the fill light module 120 can comprise various modules.

The fill light module 120 can comprise an exposure parameter determination unit 221 for determining whether the automatic exposure parameter satisfies a preset condition.

In some embodiments, the exposure parameter determination unit 221 can be configured to determine whether the automatic exposure time and the automatic exposure gain of the image sensor are within a preset exposure time range and a preset automatic exposure gain range. The preset exposure time range and the preset automatic exposure gain range can correspond to a high quality image captured by the image sensor.

The fill light module 120 can comprise an illumination intensity maintaining unit 223 configured to maintain a current illumination intensity if the automatic exposure parameter satisfies a preset condition.

In some embodiments, the illumination intensity maintaining unit 223 can be configured to control the image sensor to maintain a current automatic exposure time and a current automatic exposure gain if the automatic exposure time and the automatic exposure gain of the image sensor are within the preset exposure time range and the preset automatic exposure gain range.

The fill light module 120 can comprise an illumination intensity adjustment unit 225 configured to adjust the illumination intensity of the fill light lamp if the automatic exposure parameter does not satisfy a preset condition.

In some embodiments, the illumination intensity adjustment unit 225 can be configured to adjust a current illumination intensity of the fill light lamp if the automatic exposure time and the automatic exposure gain of the image sensor are not within the preset exposure time range and the preset automatic exposure gain range. For instance, the illumination intensity of the fill light lamp can be decreased if the automatic exposure time and the automatic exposure gain of the image sensor are below the preset exposure time range and the preset automatic exposure gain range. For instance, the illumination intensity of the fill light lamp can be increased if the automatic exposure time and the automatic exposure gain of the image sensor are above the preset exposure time range and the preset automatic exposure gain range.

The fill light module 120 can comprise an automatic fill light unit 227 configured to control the fill light lamp to provide the automatic fill light at the adjusted illumination intensity.

Figure 7:
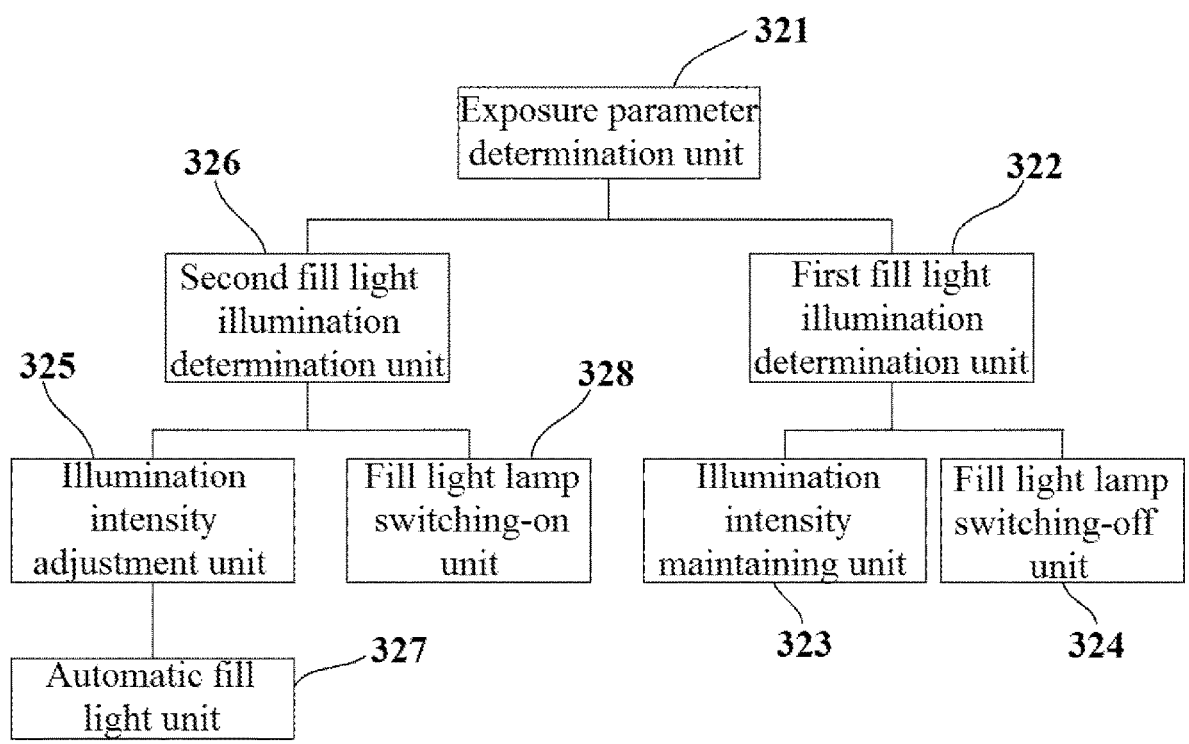
FIG. 7 is a block diagram of another example of the system of providing fill light in FIG. 5.

In some embodiments, as shown in FIG. 7, the fill light module 120 can comprise various units.

The fill light module 120 can comprise an exposure parameter determination unit 321 configured to determine whether the automatic exposure parameter satisfies a preset condition.

In some embodiments, the exposure parameter determination unit 321 can be configured to determine whether the automatic exposure time and the automatic exposure gain of the image sensor are within a preset exposure time range and a preset automatic exposure gain range. The preset exposure time range and the preset automatic exposure gain range can correspond to a high quality image captured by the image sensor.

The fill light module 120 can comprise a first fill light illumination determination unit 322 configured to determine whether the fill light lamp has provided a fill light illumination when the automatic exposure parameter satisfies a preset condition.

In some embodiments, the first fill light illumination determination unit 322 can be configured to determine whether the fill light illumination has been provided in obtaining the image frame when the automatic exposure time and the automatic exposure gain of the image sensor are within the preset exposure time range and the preset automatic exposure gain range.

The fill light module 120 can comprise a fill light lamp switching-off unit 324 configured to switch off the fill light lamp if the fill light lamp has not provided the fill light illumination and the automatic exposure parameter satisfies a preset condition.

In some embodiments, the fill light lamp switching-off unit 324 can be configured to switch off a power switch of the fill light lamp if the fill light lamp has not provided fill light illumination in obtaining the image frame by the image sensor and the automatic exposure time and the automatic exposure gain of the image sensor are within the preset exposure time range and the preset automatic exposure gain range.

The fill light module 120 can comprise an illumination intensity maintaining unit 323 configured to maintain the current illumination intensity if the fill light lamp has provided the fill light illumination and the automatic exposure parameter satisfies a preset condition.

In some embodiments, the illumination intensity maintaining unit 323 can be configured to maintain the current illumination intensity if the fill light lamp has provided the fill light illumination in obtaining the image frame by the image sensor and the automatic exposure time and the automatic exposure gain of the image sensor are within the preset exposure time range and the preset automatic exposure gain range.

The fill light module 120 can comprise a second fill light illumination determination unit 326 configured to determine whether the fill light lamp has provided the fill light illumination when the automatic exposure parameter does not satisfy a preset condition.

In some embodiments, the second fill light illumination determination unit 326 can be configured to determine whether the fill light illumination has been provided in obtaining the image frame by the image sensor and the automatic exposure time and the automatic exposure gain of the image sensor are not within the preset exposure time range and the preset automatic exposure gain range.

The fill light module 120 can comprise a fill light lamp switching-on unit 328 configured to switch on the fill light lamp when the fill light lamp has not provided the fill light illumination and the automatic exposure parameter does not satisfy a preset condition.

In some embodiments, the fill light lamp switching-on unit 328 can be configured to switch on the fill light lamp to provide the fill light illumination if the fill light lamp has not provided the fill light illumination in obtaining the image frame by the image sensor and the automatic exposure time and the automatic exposure gain of the image sensor are not within the preset exposure time range and the preset automatic exposure gain range.

The fill light module 120 can comprise an illumination intensity adjustment unit 325 configured to adjust the illumination intensity of the fill light if the fill light lamp has provided the fill light illumination and the automatic exposure parameter does not satisfy a preset condition.

In some embodiments, the illumination intensity adjustment unit 325 can be configured to adjust a current illumination intensity of the fill light lamp if the fill light lamp has provided the fill light illumination in obtaining the image frame by the image sensor and the automatic exposure time and the automatic exposure gain of the image sensor are not within the preset exposure time range and the preset automatic exposure gain range.

For instance, the illumination intensity of the fill light lamp can be decreased if the automatic exposure time and the automatic exposure gain of the image sensor are below the preset exposure time range and the preset automatic exposure gain range. For instance, the illumination intensity of the fill light lamp can be increased if the automatic exposure time and the automatic exposure gain of the image sensor are above the preset exposure time range and the preset automatic exposure gain range.

The fill light module 120 can comprise an automatic fill light unit 327 configured to control the fill light lamp to provide the automatic fill light at the adjusted illumination intensity.

Figure 8:
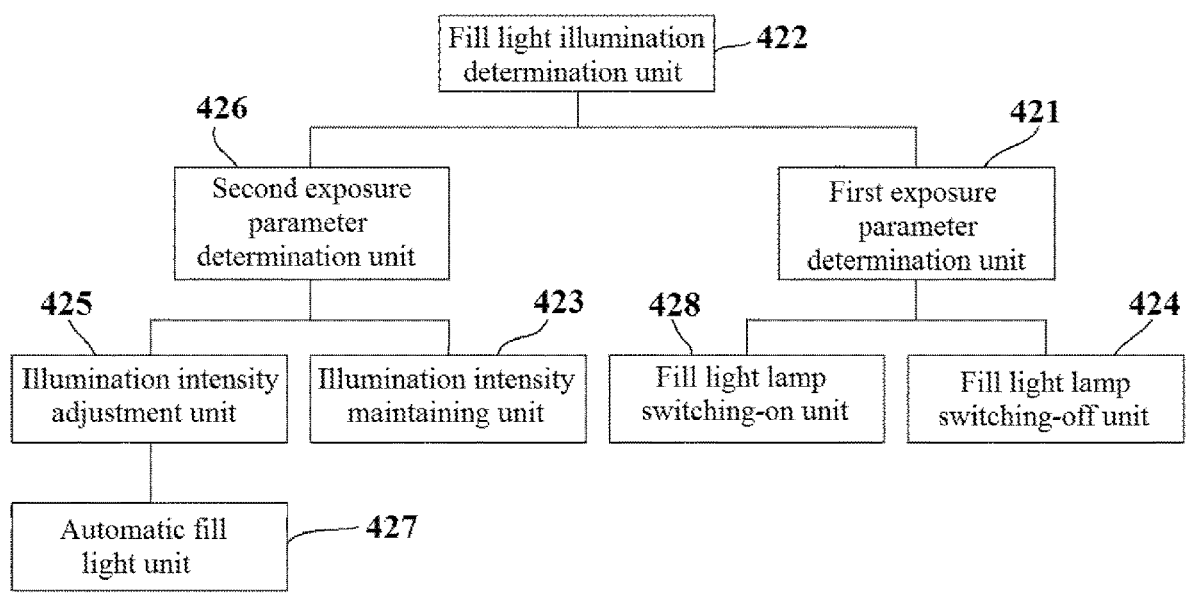
FIG. 8 is a block diagram of yet another example of the system of providing fill light in FIG. 5.

In some embodiments, as shown in FIG. 8, the fill light module 120 can comprise various units.

The fill light module 120 can comprise a fill light illumination determination unit 422 configured to determine whether the fill light lamp has provided the fill light illumination.

In some instances, the fill light illumination determination unit 422 can be configured to determine whether the fill light lamp has provided the fill light illumination in obtaining the image frame by the image sensor.

The fill light module 120 can comprise a first exposure parameter determination unit 421 configured to determine whether the automatic exposure parameter satisfies a preset condition in the case that the fill light lamp has not provided the fill light illumination.

In some embodiments, the first exposure parameter determination unit 421 can be configured to determine whether the automatic exposure time and the automatic exposure gain of the image sensor are within the preset exposure time range and the preset automatic exposure gain range if the fill light lamp has not provided the fill light illumination in obtaining the image frame by the image sensor.

The fill light module 120 can comprise a fill light lamp switching-off unit 424 configured to switch off the fill light lamp if the automatic exposure parameter satisfies a preset condition and the fill light lamp has not provided the fill light illumination.

In some embodiments, the fill light lamp switching-off unit 424 can be configured to switch off the power switch of the fill light lamp if the automatic exposure time and the automatic exposure gain of the image sensor are within the preset exposure time range and the preset automatic exposure gain range and the fill light illumination has not been provided in obtaining the image by the image sensor.

The fill light module 120 can comprise a fill light lamp switching-on unit 428 configured to switch on the fill light lamp if the automatic exposure parameter does not satisfy a preset condition and the fill light lamp has not provided the fill light illumination.

In some embodiments, the fill light lamp switching-on unit 428 can be configured to switch on the fill light lamp to provide the fill light illumination if the automatic exposure time and the automatic exposure gain of the image sensor are not within the preset exposure time range and the preset automatic exposure gain range and the fill light illumination has not been provided in obtaining the image frame by the image sensor.

The fill light module 120 can comprise a second exposure parameter determination unit 426 configured to determine whether the automatic exposure parameter satisfies a preset condition if the fill light lamp has provided the fill light illumination.

In some embodiments, the second exposure parameter determination unit 426 can be configured to determine whether the automatic exposure time and the automatic exposure gain of the image sensor are within the preset exposure time range and the preset automatic exposure gain range if the fill light illumination has been provided in obtaining the image frame by the image sensor.

The fill light module 120 can comprise an illumination intensity maintaining unit 423 configured to maintain a current illumination intensity if the automatic exposure parameter satisfies a preset condition and the fill light lamp has provided the fill light illumination.

In some embodiments, the illumination intensity maintaining unit 423 can be configured to maintain the current illumination intensity if the automatic exposure time and the automatic exposure gain of the image sensor are within the preset exposure time range and the preset automatic exposure gain range and the fill light illumination has been provided in obtaining the image frame by the image sensor.

The fill light module 120 can comprise an illumination intensity adjustment unit 425 configured to adjust the illumination intensity of the fill light if the automatic exposure parameter does not satisfy a preset condition and the fill light lamp has provided the fill light illumination.

In some embodiments, the illumination intensity adjustment unit 425 can be configured to adjust the current illumination intensity of the fill light lamp if the automatic exposure time and the automatic exposure gain of the image sensor are not within the preset exposure time range and the preset automatic exposure gain range and the fill light illumination has been provided in obtaining the image frame by the image sensor.

For instance, the illumination intensity of the fill light lamp can be decreased if the automatic exposure time and the automatic exposure gain of the image sensor are below the preset exposure time range and the preset automatic exposure gain range. For instance, the illumination intensity of the fill light lamp can be increased if the automatic exposure time and the automatic exposure gain of the image sensor are above the preset exposure time range and the preset automatic exposure gain range.

The fill light module 120 can comprise an automatic fill light unit 427 configured to control the fill light lamp to provide the automatic fill light at the adjusted illumination intensity.

Figure 9:
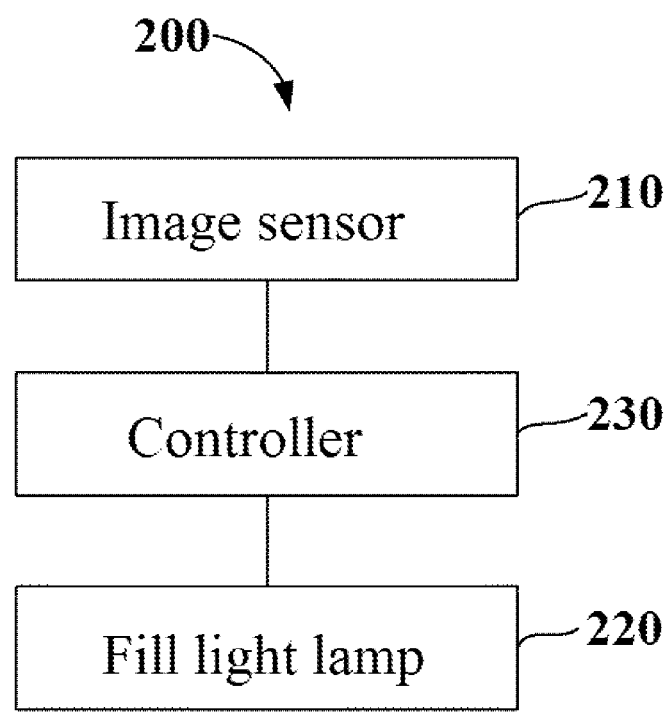
FIG. 9 shows a schematic diagram of an imaging device in accordance with embodiments of the disclosure.

Referring to FIGS. 1, 2 and 9, based upon the method of providing fill light as discussed hereinabove, embodiments of the disclosure also provide an imaging device embodying the method of providing fill light.

An imaging device 200 in accordance with embodiments of the disclosure can comprise an image sensor 210, a fill light lamp 220 and a controller 230.

The image sensor 210 can be configured to capture images. For example, the image sensor 210 can be a charge coupled device (CCD) image sensor, or a complementary metal oxide semiconductor (CMOS) image sensor.

The fill light lamp 220 can be configured to provide a fill light for an ambient environment of the image sensor 210. The fill light lamp 220 can be a natural light LED or an infrared LED.

The controller 230 can be configured to obtain an exposure parameter of the image sensor 210 and control the fill light lamp 220 to provide an automatic fill light based upon the automatic exposure parameter.

In some embodiments, the controller 230 can be configured to obtain an automatic exposure parameter of a current image of the image sensor 210 in real-time.

In some instances, the controller 230 can be configured to calculate an automatic fill light parameter of a next image based upon the automatic exposure parameter of the current image, and control the fill light lamp 220 to provide the fill light based upon the automatic fill light parameter in real-time. In some embodiments, the automatic fill light parameter can comprise at least one of a switch status of the fill light lamp or an illumination intensity of the fill light lamp.

In some instances, the controller 230 can be configured to adjust the illumination intensity of the fill light of the next image by a preset increment if the automatic exposure parameter of the current image does not satisfy a preset condition.

In some embodiments, the fill light module can comprise a calculation module and a control module. The calculation module can be configured to calculate the automatic fill light parameter of the next image based upon the automatic exposure parameter of the current image. The control module can be configured to control the fill light lamp in real-time to provide the fill light based upon the automatic fill light parameter.

In some instances, the system of providing fill light 100 can comprise an execution module. The execution module can direct the exposure parameter acquisition module and the fill light module to repeatedly perform the processing until the image sensor stops obtaining images.

In some instances, the automatic fill light parameter can comprise at least one of a switch status of the fill light lamp or an illumination intensity of the fill light lamp.

In some instances, the calculation module can adjust the illumination intensity of the fill light for the next image by a preset increment if the automatic exposure parameter of the current image does not satisfy a preset condition.

It will be appreciated that, the preset increment can correspond to a preset automatic exposure parameter. In some embodiments, different preset increments can correspond to different preset automatic exposure parameter ranges. For instance, a preset increment L1 can correspond to a preset automatic exposure parameter range A1~A2, and a preset increment L2 can correspond to a preset automatic exposure parameter range A2~A3. The preset increment L1 can be used if the automatic exposure parameter B of the current image is within the range A1~A2, and the preset increment L2 can be used if the automatic exposure parameter B of the current image is within the range A2~A3.

Alternatively, different preset increments can correspond to different individual preset automatic exposure parameter values. For instance, preset increments L1, L2, L3 and L4 can respectively correspond to preset automatic exposure values A1, A2, A3 and A4. The preset increment L1 can be used if the automatic exposure parameter of the current image is A1, and the preset increment L2 can be used if the automatic exposure parameter of the current image is A2, and so forth.

The preset increments can gradually decrease with an increasing number of consecutive adjustments of the illumination intensity of the fill light. For instance, the preset increments L1, L2 and L3 can gradually decrease in this order. The increment L1 can be used when a first adjustment of the illumination intensity of the fill light is performed, the increment L2 can be used when a second adjustment of the illumination intensity of the fill light is performed, and the increment L3 can be used when a third adjustment of the illumination intensity of the fill light is performed.

The automatic exposure parameter of the image sensor 210 can comprise an automatic exposure time and an automatic exposure gain. In some embodiments, one of the automatic exposure time and the automatic exposure gain can be selected as a reference parameter in controlling the fill light lamp 220. Alternatively, the automatic exposure time and the automatic exposure gain can both be selected as reference parameters in controlling the fill light lamp 220.

In some embodiments, the controller 230 can be configured to control a power switch of the fill light lamp 220 based upon the automatic exposure parameter. For instance, the controller 230 can be configured to turn off the power switch of the fill light lamp 220 if the automatic exposure parameter satisfies a preset condition. For instance, the controller 230 can be configured to turn on the power switch of the fill light lamp 220 if the automatic exposure parameter does not satisfy the preset condition.

In some embodiments, the controller 230 can be configured to control the illumination intensity of the fill light lamp 220 based upon the automatic exposure parameter. For instance, the controller 230 can be configured to control the fill light lamp 220 to maintain an illumination intensity if the automatic exposure parameter satisfies a preset condition. For instance, the controller 230 can be configured to control the fill light lamp 220 to adjust an illumination intensity if the automatic exposure parameter does not satisfy the preset condition. In some instances, the controller 230 can be configured to control the fill light lamp 220 to increase an illumination intensity if the automatic exposure parameter is above a preset exposure parameter range. Optionally, the controller 230 can be configured to control the fill light lamp 220 to decrease an illumination intensity if the automatic exposure parameter is below the preset exposure parameter range.

In some embodiments, the image sensor 210 can be configured to capture consecutive image frames. In this circumstance, the controller 230 can be configured to obtain an automatic exposure parameter of the consecutive image frames. The controller 230 can be configured to control the fill light lamp 220 to provide the automatic fill light based upon an automatic exposure parameter of each image frame.

In some embodiments, a frame rate of consecutive image frames can be 10 Hz to 20 Hz. The number of frames of the consecutive image frames can be less than 100.

The disclosure also provides a movable object having the imaging device 200.

Figure 10:
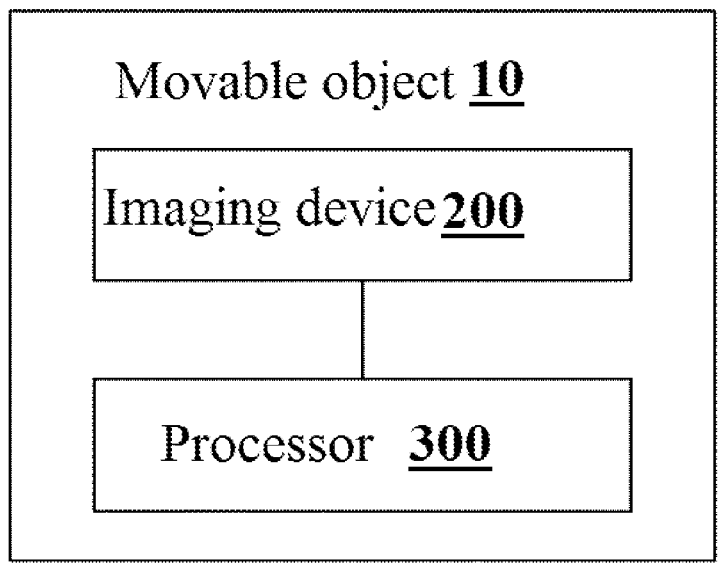
FIG. 10 shows a schematic diagram of a movable object in accordance with embodiments of the disclosure.

Referring to FIG. 10, a movable object 10 in accordance with embodiments of the disclosure can comprise the imaging device 200 and a processor 300. The processor 300 can be configured to process images obtained by the imaging device 200.

In some embodiments, the movable object can be an unmanned aerial vehicle or a robot.

It will be appreciated that, the device and method as disclosed in the embodiments of the disclosure can be provided with other approaches. For example, the device embodiments as described hereinabove are merely illustrative. For example, a division of the modules and units is merely a logical and functional division, and various other divisions can be possible. For example, various units or components can be combined or integrated into another system, or certain features can be omitted or not performed. Moreover, a coupling, a direct coupling or a communication connection as illustrated or discussed in the disclosure can be an indirect coupling or a communication connection via interface, means or units, and can be an electrical coupling, a mechanical coupling or a coupling in other forms.

The units illustrated as separate parts may or may not be physically separated. The parts shown as units may or may not be physical units. For example, the parts can be provided at the same location or distributed over a plurality of network units. All or part of the units can be selected to implement the embodiments of the disclosure according to actual requirements.

Various functional units in the embodiments of the disclosure may be integrated into a processing unit or may be provided as physically separate units. Two or more units can be integrated into one single unit. The integrated units can be implemented either in hardware or in software.

The integrated units can be stored in a computer readable storage medium when implemented in form of software functional units and sold or used as a standalone product. All or part of the technical solution of the disclosure can be embodied in the form of software product stored in a storage medium comprising a number of instructions for causing a computer processor to perform the entire or part of a method consistent with embodiments of the disclosure, such as one of the above-described exemplary methods. The storage medium can comprise a flask disk, a removable hard drive, a read only memory (ROM), a random access memory (RAM), a magnet disk, an optical disk, or other media capable of storing program code.

The above description merely illustrates some embodiments of the disclosure and is not intended to limit the scope of the disclosure. Any equivalent changes in structures or processes made in light of the specification and the drawings, and their direct or indirect application in other related technical fields, should all be covered within the scope of the present disclosure.

What is claimed is:

1. A system, comprising:
    an image sensor configured to obtain consecutive image frames;
    an exposure parameter acquisition unit configured to obtain a current automatic exposure parameter of a current image frame of the consecutive image frames; and
    a fill light controller configured to adjust an illumination intensity of a fill light lamp for a next image frame based on the current automatic exposure parameter and a preset condition by increasing or decreasing the illumination intensity of the fill light lamp for the next image frame by a preset increment if the automatic exposure parameter does not satisfy the preset condition, wherein the preset increment is pre-determined based on the current automatic exposure parameter.

2. The system of claim 1, further comprising:
    an execution unit configured to direct the exposure parameter acquisition unit to repeatedly obtain the current automatic exposure parameter and to direct the fill light controller to repeatedly adjust the illumination intensity of the fill light lamp until the image sensor stops obtaining the consecutive image frames.

3. The system of claim 1, wherein the preset increment is a specific preset increment corresponding to a specific automatic exposure parameter range, wherein the current automatic exposure parameter falls within the specific automatic exposure parameter range.

4. The system of claim 1, wherein the preset increment corresponds to a number of consecutive adjustments of the illumination intensity of the fill light lamp prior to obtaining the current automatic exposure parameter from the current image frame.

5. The system of claim 4, wherein the preset increment gradually decreases with an increasing number of consecutive adjustments of the illumination intensity of the fill light lamp prior to obtaining the current automatic exposure parameter from the current image frame.

6. The system of claim 1, wherein the fill light controller is further configured to maintain the illumination intensity of the fill light lamp for the next image frame if the current automatic exposure parameter satisfies the preset condition.

7. The system of claim 1, wherein the fill light controller comprises an illumination intensity controller configured to:
    determine a current illumination intensity of the fill light lamp for the current image frame; and
    calculate a next illumination intensity of the fill light lamp for the next image frame based on the current illumination intensity and the preset increment, if the automatic exposure parameter does not satisfy the preset condition.

8. The system of claim 1, wherein the fill light controller comprises a power switch controller configured to:
    determine a current switch status associated with a power switch of the fill light lamp for the current image frame;
    turn on the power switch of the fill light lamp for the next image frame, if the current switch status is off and the automatic exposure parameter does not satisfy the preset condition; and
    turn off the power switch of the fill light lamp for the next image frame, if the current switch status is on and the automatic exposure parameter satisfies the preset condition.

9. The system of claim 1, wherein the fill light controller comprises a power switch controller configured to:
    turn off a power switch of the fill light lamp when the image sensor stops obtaining the consecutive image frames.

10. The system of claim 1, wherein the automatic exposure parameter is an automatic exposure time or an automatic exposure gain.

11. The system of claim 10, wherein the fill light controller comprises a power switch controller configured to:
    turn off a power switch of the fill light lamp if the automatic exposure time is shorter than an automatic exposure time threshold or if the automatic exposure gain is lower than an automatic exposure gain threshold.

12. A movable object, comprising:
    an image sensor configured to obtain consecutive image frames;
    a fill light lamp configured to provide a fill light for the consecutive image frames; and
    a controller configured to:
        obtain a current automatic exposure parameter of a current image frame of the consecutive image frames; and
        adjust an illumination intensity of the fill light lamp for a next image frame based on the current automatic exposure parameter and a preset condition by increasing or decreasing the illumination intensity of the fill light lamp for the next image frame by a preset increment if the current automatic exposure parameter does not satisfy the preset condition, wherein the preset increment is pre-determined based on the current automatic exposure parameter.

13. The movable object of claim 12, wherein the preset increment is a specific preset increment corresponding to a specific automatic exposure parameter range, wherein the automatic exposure parameter falls within the specific automatic exposure parameter range.

14. The movable object of claim 12, wherein the preset increment corresponds to a number of consecutive adjustments of the illumination intensity of the fill light lamp prior to obtaining the current automatic exposure parameter from the current image frame.

15. The movable object of claim 14, wherein the preset increment gradually decreases with an increasing number of consecutive adjustments of the illumination intensity of the fill light lamp prior to obtaining the current automatic exposure parameter from the current image frame.

16. The movable object of claim 12, wherein the controller is further configured to:
    determine a current illumination intensity of the fill light lamp for the current image frame; and
    calculate a next illumination intensity of the fill light lamp for the next image frame based on the current illumination intensity and the preset increment, if the automatic exposure parameter does not satisfy the preset condition.

17. The movable object of claim 12, wherein controller is further configured to:
- determine a current switch status associated with a power switch of the fill light lamp for the current image frame;
- turn on the power switch of the fill light lamp for the next image frame, if the current switch status is off and the automatic exposure parameter does not satisfy the preset condition; and
- turn off the power switch of the fill light lamp for the next image frame, if the current switch status is on and the automatic exposure parameter satisfies the preset condition.

18. The movable object of claim 12, wherein the automatic exposure parameter is an automatic exposure time or an automatic exposure gain.

19. The movable object of claim 18, wherein controller is further configured to:
- turn off a power switch of the fill light lamp if the automatic exposure time is shorter than an automatic exposure time threshold or the automatic exposure gain is lower than an automatic exposure gain threshold.

20. A method, comprising:
- obtaining consecutive image frames by an image sensor;
- obtaining, by a controller, a current automatic exposure parameter of a current image frame of the consecutive image frames; and
- adjusting, by the controller, an illumination intensity of a fill light lamp for a next image frame based on the current automatic exposure parameter and a preset condition by increasing or decreasing the illumination intensity of the fill light lamp for the next image frame by a preset increment if the current automatic exposure parameter does not satisfy the preset condition, wherein the preset increment is pre-determined based on the current automatic exposure parameter.

21. The method of claim 20, wherein the preset increment is a specific preset increment corresponding to a specific automatic exposure parameter range, wherein the current automatic exposure parameter falls within the specific automatic exposure parameter range.

22. The method of claim 20, wherein the preset increment corresponds to a number of consecutive adjustments of the illumination intensity of the fill light lamp prior to obtaining the current automatic exposure parameter from the current image frame.

23. The method of claim 22, wherein the preset increment gradually decreases with an increasing number of consecutive adjustments of the illumination intensity of the fill light lamp prior to obtaining the current automatic exposure parameter from the current image frame.

24. The method of claim 20, further comprising:
- determining a current illumination intensity of the fill light lamp for the current image frame; and
- calculating a next illumination intensity of the fill light lamp for the next image frame based on the current illumination intensity and the preset increment, if the automatic exposure parameter does not satisfy the preset condition.

25. The method of claim 20, further comprising:
- determining a current switch status associated with a power switch of the fill light lamp for the current image frame;
- turning on the power switch of the fill light lamp for the next image frame, if the current switch status is off and the automatic exposure parameter does not satisfy the preset condition; and
- turning off the power switch of the fill light lamp for the next image frame, if the current switch status is on and the automatic exposure parameter satisfies the preset condition.

* * * * *